United States Patent
Van Vleet

[15] 3,656,197
[45] Apr. 18, 1972

[54] REUSABLE SWAGING TAP
[72] Inventor: John M. Van Vleet, Hartland, Wis.
[73] Assignee: Balax, Inc., North Lake, Wis.
[22] Filed: Apr. 12, 1971
[21] Appl. No.: 133,238

Related U.S. Application Data

[63] Continuation-in-part of Ser. No. 783,972, Dec. 16, 1968.

[52] U.S. Cl. ............................................................. 10/152
[51] Int. Cl. ................................................. B21h 3/08, B23g 7/00
[58] Field of Search ........................... 10/140, 141, 152, 152 T; 408/215, 216, 222, 226, 227, 229

[56] References Cited

UNITED STATES PATENTS

| | | | |
|---|---|---|---|
| 2,352,982 | 7/1944 | Tomalis | 10/152 |
| 2,807,813 | 10/1957 | Wells | 10/152 |
| 3,248,747 | 5/1966 | Scott | 10/152 |
| 3,251,080 | 5/1966 | Sharon | 10/152 |
| 3,258,797 | 7/1966 | Budd | 10/152 |

Primary Examiner—Richard J. Herbst
Assistant Examiner—E. M. Combs
Attorney—Wheeler, House & Wheeler

[57] ABSTRACT

The disclosed swaging tap has lobes or high points of its thread disposed on a helical spiral twist path of opposite hand to the thread, the angle of the reverse twist path with respect to the tap axis being either identical to the helical angle of the thread or at least materially less than twice the helical angle of the thread, the angle of the thread being by definition the angle between the thread crest and a plane normal to the axis.

2 Claims, 8 Drawing Figures

PATENTED APR 18 1972 3,656,197
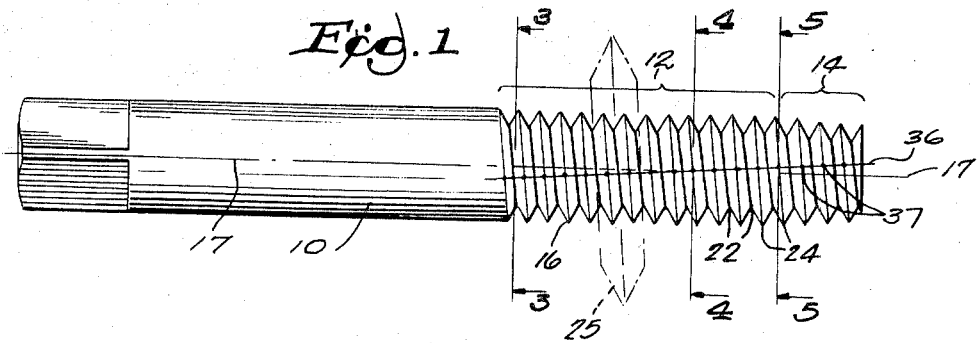
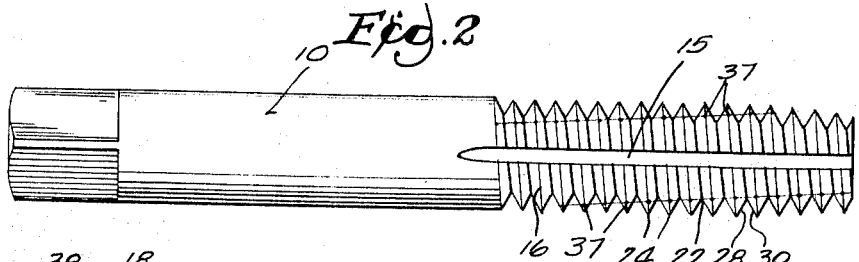
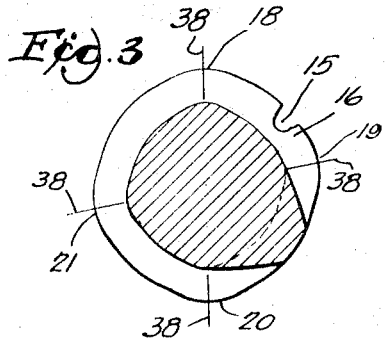 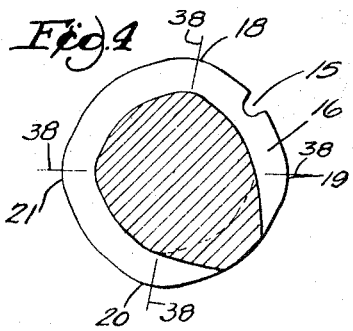 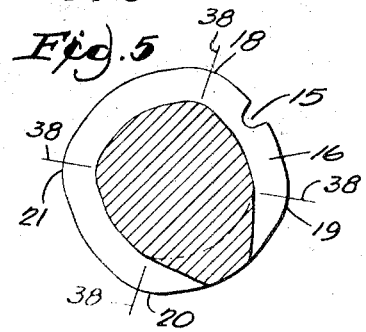
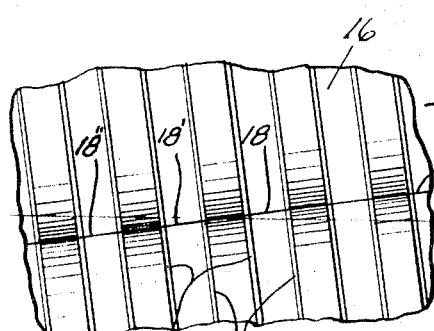
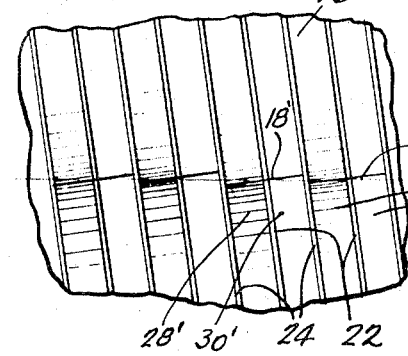
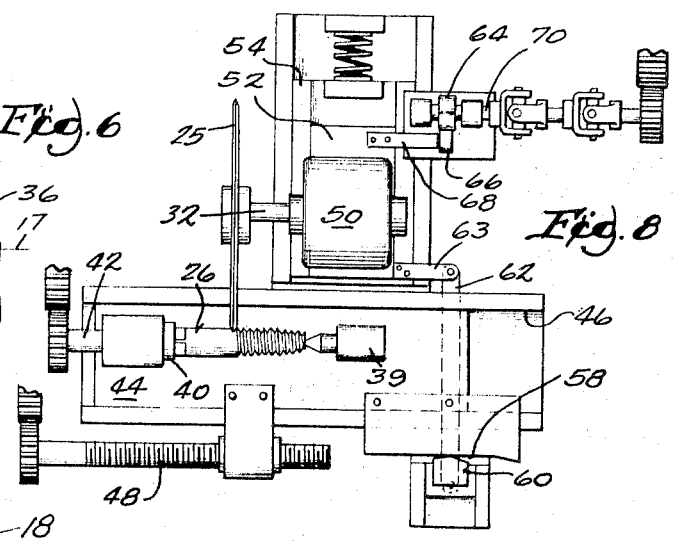
INVENTOR
JOHN M. VAN VLEET
BY Wheeler, Wheeler, House & Clemency
ATTORNEYS

REUSABLE SWAGING TAP

Cross-reference is made to my parent application Ser. No. 783,972 now abandoned of which this is a continuation-in-part.

BACKGROUND OF INVENTION

Errors in the production of forming taps occur both in the use of male and female grinding wheels but are more significant and more damaging when the tap is made with a male grinding wheel, in which case the maximum error occurs at the pressure points on the flanks of the tap teeth adjacent the crest.

Assuming that the lobes or high points of the forming tap tooth are aligned with each other along the tap axis, or assuming that these high points are disposed on a helix of the same hand as that of the tap thread, in either case, the necessary angularity of the wheel axis regarding the tap blank axis will cause the error. The error is attributable to the fact that the flank portions of the tap thread on one side of each turn of the tooth reach a high point at a slightly different point circumferentially of the tap from the high point on the other flank generated by the grinding wheel on the next revolution. (Similar error would appear if the high points were aligned on a helix of the opposite hand but of more than twice the helical angle of the tap thread crest.)

According to the present invention, this problem is overcome by so organizaing the tap geometry that the high points of the tap thread are disposed on a helical twist opposite in sense to that of the thread and of approximately the same angle as the thread crest, thus compensating for the circumferential offset which would otherwise occur in the grinding of the thread.

The invention is embodied in a swaging or forming tap in which the thread, at least in the lead section, has pressure areas or lobes repeated in each revolution about the tap axis, such corresponding pressure areas being offset circumferentially in successive revolutions to conform to an imaginary helical line having a sense opposite to that of the tap thread and having a reverse twist angle less than double the helical angle of the tap thread crest. These pressure areas or lobes obviously exist not only at the crest but also on adjacent portions of the flanks of the thread, gradually building up to maximum radius and then decreasing in radius to provide relief between the lobes.

By definition, the helical angle of the tap thread crest is measured with reference to a plane normal to the tap axis. The reverse helical twist angle, on the other hand, is measured with reference to the axis. The advantages of the invention are at a maximum when the reverse twist angle is equal in value to the helical angle of the tap thread crest. Some of the advantages may be realized if the angle of the reverse twist is either less than or greater than the helical angle of the thread, provided that the reverse twist angle is substantially more than zero and substantially less than twice the value of the helical angle of the thread.

While the preferred construction aligns these pressure areas upon a helical line of opposite sense to that of the thread, it will be observed that the ultimate objective is to have the pressure areas on the respective flanks of each turn of thread in alignment with each other in a direction transverse to the direction of the intervening crest.

BRIEF DESCRIPTION OF DRAWINGS

FIG. 1 is a plan view of a tap embodying the invention, the location in front of the tap of a grinding wheel used in the formation of such a tap being shown on a reduced scale in broken lines.

FIG. 2 shows the tap of FIG. 1 viewed from a position at right angles to the viewpoint of FIG. 1.

FIG. 3 is a view taken in section on the line 3—3 of FIG. 1.
FIG. 4 is a view taken in section on the line 4—4 of FIG. 1.
FIG. 5 is a view taken in section on the line 5—5 of FIG. 1.
FIG. 6 is a greatly enlarged fragmentary detail view of a portion of the tap threads shown in FIG. 1.

FIG. 7 is a view similar to FIG. 6 but illustrating a prior art tap structure. Diagrammatically it identifies crests and roots.

FIG. 8 is a diagrammatic view of the type of equipment usable in tap manufacture generally and in the production of taps embodying the present invention.

DETAILED DESCRIPTION

The tap shown in FIGS. 1 and 2 has body portion 10, a generally cylindrical portion 12, and a conically tapering lead portion 14. A tap thread 16 of substantially constant pitch is formed on the cylindrical portion 12 and tapering lead portion 14. While all portions of the thread lie in pitch upon a predetermined helix, the thread is not necessarily continuous, it being desirable in most taps to provide a channel 15 for oil pressure relief.

In each revolution of the helical thread 16 about the axis 17 of the tap, at least on the lead portion 14, the thread has two or more pressure areas or forming lobes with intervening radial relief. There is not necessarily any lobe or any radial relief on the thread formed on the cylindrical portion 12. In the instant tap, it happens that there are four such lobes indicated at 18, 19, 20, and 21. This sequence of lobes is repeated in an angle slightly less than each 360° segment of the thread in a helical path about the axis 17 of the tap.

FIG. 7 shows in greatly exaggerated detail and on a very much enlarged scale the fact that the corresponding high points of lobes 18 on successive turns of a conventional forming tap are circumferentially staggered with reference to each other instead of being aligned. The male grinding wheel 25 which produces the thread 16 has its axis generally normal to the lines 22 and 24 representing the roots and crests of the thread. In relative rotation of the blank 26 respecting the wheel 25, the wheel operates in the root or valley 22 between successive threads. Thus the two sides of the wheel operate concurrently on the flanks of two different teeth. It will grind the flank 28 of one tooth and the flank 30 of the next adjacent tooth. By reason of the angle of the grinding wheel shaft 32 (FIG. 8) the area of maximum pressure represented by the crest of lobes of successive teeth will be offset circumferentially with reference to the area of maximum pressure of the lobe of the preceding tooth. When the wheel is then advanced between the flank 28' and the flank 30', the area of maximum pressure on flank 28' is circumferentially offset on lobe 18' from the flank 30 on lobe 18.

It will be understood that in referring to the high point I do not refer merely to the crest portion of the tooth but to the corresponding laterally adjacent area where maximum pressure on the work is exerted by the contiguous flank portions of each tooth.

In the use of a prior art tap as shown in FIG. 7 and above described, the work will not exert pressure equally and oppositely upon the teeth but will exert a higher axial pressure first in a backward direction and then in a forward direction, causing excessive strain as the result of unbalance of pressures normal to the helix angle of the tooth crest.

According to the present invention, my improved tap has the maximum pressure area on one flank aligned transversely of the crest with a maximum pressure area on the opposite flank at each lobe of each tooth. In the preferred construction achieving this result, the lobes are progressively offset circumferentially in successive turns of the thread 16, the geometry being such that the high points 18, 18', 18'', etc. are aligned as shown in FIG. 6 upon an imaginary reverse twist line 36 having an angle with reference to the axis 17 which approximates, or equals, the helical angle of thread 16 but is opposite thereto in sense. This compensates for the above described error and produces a tap in which the high points on the flanks 28 and 30 are not only aligned with each other but with the high points on the flanks 28' and 30' and flanks of consecutive turns of the thread throughout the tap. Thus axial pressures on the work in which the tap is used and on each tap tooth are symmetrically equal and opposite.

While it is preferred that the reverse twist angle of the line 36 be identical with and opposite to the helix angle of the crest of thread 16, it will be observed that the advantages of the invention are available in greater or lesser degree if other relative angles are used, provided the angle of the line 36 with respect to the axis 17 is opposite in sense to the helix angle of the thread crest and is substantially more than zero and substantially less than double the angle of the thread crest with respect to a plane normal to the axis.

The tap shown has a righthand thread. The line 36 connecting corresponding high points is a lefthand helix. For purposes of the present disclosure, dots 37 are used in FIGS. 1 and 2 to represent the high points at the crests. The imaginary line 36 connects the dots 37 to show the reverse helix. If the tap were a lefthand tap, the line 36 would follow a righthand helix, it being desirable that its spiral be of opposite sense to that of the thread 16 which provides crest 24. To indicate that the high points extend onto the flanks, the high points are represented by short generally radial lines 38 in FIGS. 3 to 5.

The flute 15 is represented as being parallel to the tap axis but obviously it is only necessary that it lie between the high points.

In the light of the foregoing disclosure, it is believed that anyone skilled in the tap manufacturing art will be able to produce taps embodying the instant invention. Therefore, the showing in FIG. 8 of apparatus usable for this purpose is entirely diagrammatic and is not intended to represent actual structure.

The tap blank 26 is held between a center 39 and a chuck 40 carried by driving shaft 42. The blank and center are mounted on a slide or bed 44 which is reciprocable longitudinally in a way 46 by means of a screw 48 which determines the lead.

The grinding wheel 25 and its driving motor 50 are mounted on a slide 52 which is movable transversely to the path of movement of work-supporting slide 44. Slide 52 is carried upon a second slide 54 reciprocable on the same path. The slide 54 is used to determine the angle of the conically tapered lead portion 14 of the tap.

Cam 58 is mounted on the work supporting slide 44 and cooperates with a cam follower 60 which moves in and out transversely of the way 46 and is connected by link 62 with an arm 63 on the slide 54.

The slide 52 will, of course, partake of the movement of side 54 but has independent in and out movement for forming the lobes and the reliefs between lobes. This is brought about by a cam 64 which has a number of lobes corresponding to the number of lobes to be formed on the thread 16 of the tap. In this case, the number is four. A cam follower 66 engaged by cam 64 is mounted on an arm 68 projecting from the slide 52. The rate of rotation of the shaft 70 which drives cam 64 is so determined as to be just sufficiently different from the rate of rotation of the blank 26 to effect substantial alignment of the high points on a helix 36 as shown at FIGS. 3 to 6, inclusive.

Reference to FIGS. 3 to 5 shows how, in the tap of the present invention, there is progressive circumferential offset of each of the high points or lobes 18, 20, 22 and 24. This offset is preferably identically equal and opposite to the circumferential offset which, in the absence of the corrective action above described, would result in staggered high points as shown in FIG. 7 and exemplified in prior art taps.

I claim:

1. As a new article of manufacture, a re-usable swaging tap having a tap body with a lead portion encircled by successive turns of a helical thread, said thread having crest and flank portions and including in each turn a plurality of lobes with pressure areas and intervening relief areas in its crest and flank portions, the tap being characterized by an alignment of the crest portions of corresponding pressure areas of successive turns upon a helix of opposite sense to the thread and at an angle with respect to the tap axis which is not as great as twice the helical angle of the thread.

2. As a new article of manufacture, a re-usable swaging tap having a tap body with a lead portion encircled by successive turns of a helical thread, said thread having crest and flank portions and including in each turn a plurality of lobes with pressure areas and intervening relief areas in its crest and flank portions, the tap being characterized by an alignment of the crest portions of corresponding pressure areas of successive turns upon a helix of opposite sense to the thread and at an angle with respect to the tap axis which is substantially the same as the helical angle of the thread, the pressure area flank portions on each lobe being substantially in alignment with each other in a direction transverse to the direction of the intervening crest.

* * * * *